(12) United States Patent
Kohlmeier-Beckmann et al.

(10) Patent No.: US 9,626,846 B2
(45) Date of Patent: *Apr. 18, 2017

(54) EVACUATION SLIDE WITH A LIGHTING SYSTEM FOR ILLUMINATING AN ESCAPE ROUTE

(71) Applicant: Airbus Operations GmbH, Hamburg (DE)

(72) Inventors: Carsten Kohlmeier-Beckmann, Hamburg (DE); Fred Raszpir, Hamburg (DE); Gary Leegate, St. Petersburg, FL (US); Anja Niemeyer, Hamburg (DE)

(73) Assignee: AIRBUS OPERATIONS GMBH, Hamburg (DE)

( * ) Notice: Subject to any disclaimer, the term of this patent is extended or adjusted under 35 U.S.C. 154(b) by 2 days.

This patent is subject to a terminal disclaimer.

(21) Appl. No.: 14/565,937

(22) Filed: Dec. 10, 2014

(65) Prior Publication Data

US 2016/0171848 A1 Jun. 16, 2016

(51) Int. Cl.
*G08B 7/06* (2006.01)
*B64D 25/14* (2006.01)
*B64D 47/02* (2006.01)

(52) U.S. Cl.
CPC ............ *G08B 7/066* (2013.01); *B64D 25/14* (2013.01); *B64D 47/02* (2013.01)

(58) Field of Classification Search
CPC ........ G08B 7/066; B64D 47/02; B64D 47/08; B64D 25/08; B64D 9/00; B64D 45/00; B64D 25/14; B64C 1/1423; H04N 5/2256; H04N 7/183; H04N 5/332; A62B 1/20
USPC .......................................................... 340/945
See application file for complete search history.

(56) References Cited

U.S. PATENT DOCUMENTS

2005/0180133 A1* 8/2005 Feldstein ............. B66B 23/225
362/219
2014/0009274 A1 1/2014 Kohlmeier-Beckmann et al.

FOREIGN PATENT DOCUMENTS

DE 102010055704 6/2012
WO 2012084184 6/2012
WO WO 2012084184 A1 * 6/2012 ............... A62B 3/00

* cited by examiner

*Primary Examiner* — Omer S Khan
(74) *Attorney, Agent, or Firm* — Greer, Burns & Crain, Ltd.

(57) ABSTRACT

An evacuation slide comprises a sliding face having a top end portion adapted to be positioned adjacent to an exit of a region to be evacuated, and a bottom end portion adapted to be positioned adjacent to an escape route leading away from the region to be evacuated and being arranged at a lower height than the region to be evacuated. A light signal generating device is adapted to irradiate at least one light beam onto the escape route which extends further in a direction parallel to a center line of the escape route than in a direction perpendicular to the center line of the escape route so as to indicate a predefined evacuation direction along the escape route.

14 Claims, 5 Drawing Sheets

EVACUATION SLIDE WITH A LIGHTING SYSTEM FOR ILLUMINATING AN ESCAPE ROUTE

BACKGROUND OF THE INVENTION

The present invention relates to an evacuation slide provided with a lighting system for illuminating an escape route. Further, the invention relates to a vehicle, in particular an aircraft equipped with an evacuation slide of this kind.

Current passenger aircraft are equipped with inflatable evacuation slides which allow evacuating passengers and crew members from an aircraft cabin after an emergency or crash landing of the aircraft. Typically, an inflatable evacuation slide is associated with a door or an emergency exit of the aircraft cabin such that persons leaving the aircraft cabin through the door or emergency exit can step on or jump on the evacuation slide and slide down the evacuation slide to the ground. Hence, the evacuation slides ensure that passengers and crew members can leave the aircraft cabin even in case the aircraft is of a size which does not allow a direct escape from the cabin to the ground.

Typically, an evacuation of all passengers on board the aircraft within 90 seconds has to be guaranteed with 50% of the doors available for evacuation. The maximum passenger number for a cabin equipped with, for example, four (4) Type A exit pairs is limited to 440 passengers. An increase of the passenger number thus requires equipping the aircraft cabin with an additional door or door pair which, however, might be undesirable because of the technical outlay, the costs and the weight. On the other hand, experience has shown that currently used evacuation slides are in principle capable of dealing flow rates more than a 110 person Type A exit rating. However, experience from tests indicates that many evacuees are reluctant to move as quickly as they could due to missing guidance and features providing clear view about the descent, in particular in dark-of-night conditions.

DE 10 2010 055 704 A1 and WO 2012/084184 A1 therefore propose to equip a system for evacuating persons from a vehicle with a light signal generating device, which is adapted to emit at least one visual light signal that indicates at least one preset escape route for at least one person that is to be evacuated. The light signal generating device generates a visual light signal that may be discerned by a person and that informs and/or instructs the person, in which direction or at which location the person may reach safety in a hazardous situation. For example, the light signal generating device may be adapted to emit a light signal in the region of a dividing device, which divides an evacuation slide into a first slideway and a second slideway and extends substantially over the length of the evacuation slide. Alternatively or additionally, the light signal generating device may be adapted to display a light signal in a region of a top end of the evacuation slide which indicates a first position that is adjusted to a preset first entry point of the evacuation slide or in a region extending from the bottom end of the evacuation slide in a direction leading away from the evacuation slide.

SUMMARY OF THE INVENTION

The invention is directed at an object of providing an evacuation slide having a lighting system which allows an improved guidance and orientation of persons being evacuated with the aid of the evacuation slide upon leaving the evacuation slide. Further, the invention is directed to an object of providing a vehicle, in particular an aircraft, which is equipped with an evacuation slide of this kind.

An evacuation slide according to the invention comprises a sliding face having a top end portion adapted to be positioned adjacent to an exit of a region to be evacuated. The exit may be an emergency exit or a regular door of the region to be evacuated. The region to be evacuated may be a building or a part of a building, but may also be a vehicle such as, for example, a ship, a train or an aircraft, or a part of a vehicle. The top end portion of the sliding face may be adapted to be positioned directly, that is to say, immediately adjacent to the exit of the region to be evacuated. It is, however, also conceivable to design the top end portion of the sliding face in such a way that the top end portion of the sliding face is connectable to the exit of the region to be evacuated via a suitable transition element.

The sliding face further comprises a bottom end portion adapted to be positioned adjacent to an escape route leading away from the region to be evacuated and being arranged at a lower height than the region to be evacuated. The escape route may be a predefined route which may be marked so as to direct an evacuee, but may also be any arbitrary route which is not further defined, as long as it leads away from the region to be evacuated. For example, the escape route may be a predefined or not further defined route on the ground which leads away from the region to be evacuated which in turn is arranged at a certain elevation above the ground. The sliding face of the evacuation slide thus defines an inclined slide path connecting the region to be evacuated to the escape route arranged at a lower elevation level. The evacuation slide thus is particularly suitable for use in a vehicle such as, for example, an aircraft for evacuating persons from a cabin positioned above the ground, since the evacuation slide allows persons leaving the vehicle cabin to quickly slide down to an escape route on the ground. After reaching the ground, the evacuees may move further away from the vehicle to be evacuated by following the escape route on the ground.

The evacuation slide further comprises a light signal generating device adapted to irradiate at least one light beam onto the escape route which extends further in a direction parallel to a center line of the escape route than in a direction perpendicular to the center line of the escape route, so as to indicate a predefined evacuation direction along the escape route. The light beam produced by means of the light generating device provides a clear indication for an evacuee on the evacuation direction along which he or she has to move along the escape route after stepping off the sliding face of the evacuation slide, not only immediately after leaving the evacuation slide, but also at a greater distance therefrom. Furthermore, the light beam is already visible for the evacuee when the evacuee steps on the sliding face of the evacuation slide at the top end portion thereof. As a result, the confidence of evacuees about to leave the sliding face of the evacuation slide and to continue their way along the escape route in an intuitive manner is increased. Thus, hesitation can be avoided and the evacuation flow rate in the area of the top end portion of the sliding face can be increased.

Moreover, the at least one light beam irradiated onto the escape route by the light signal generating device provides for an illumination of the escape route leading away from the region to be evacuated, for example, on the ground, and hence helps the evacuees to identify obstacles on the escape route. As a consequence, an evacuee moving along the escape route is enabled to avoid obstacles resulting in a reduced risk of injuries. The at least one light beam irradiated onto the escape route by the light signal generating device thus also allows avoiding disturbance of the evacuee flow rate at the bottom end of the evacuation slide and along the escape route. In summary, the evacuation slide allows improving guidance and orientation of persons being evacuated with the aid of the evacuation slide and hence helps not only to increase the evacuee flow rate from the region to be evacuated, but also to reduce the risk of injuries to the evacuees, in particular in dark-of-night conditions.

In a preferred embodiment of the evacuation slide, the light signal generating device is adapted to generate at least one substantially fan-shaped light beam. The fan-shaped light beam may have a maximum light intensity plane which extends substantially perpendicular to a surface of the escape route. Although the light pattern of the light beam generated by the light signal generating device includes an inevitable diffuse portion, the light pattern thus preferably comprises a fan-shaped maximum light intensity plane which extends substantially perpendicular to the surface of the escape route either substantially parallel to the center line of the escape route or slanted relative to the center line of the escape route.

A substantially fan-shaped light beam with a maximum light intensity plane extending substantially perpendicular to the surface of the escape route has the advantage that the desired illumination, and hence indication, of the predefined evacuation direction along the escape route can still be achieved, even in case of a varying arrangement or orientation of the evacuation slide relative to the surface of the escape route. Hence, the light beam is still able to illuminate, and hence indicate, the predefined evacuation direction along the escape route even in case the inclination angle or the orientation of the evacuation slide relative to the surface of the escape route deviates from the usual inclination angle or orientation, for example, due to a broken landing gear of an aircraft equipped with the evacuation slide.

The light signal generating device may be adapted to irradiate a pair of light beams onto the escape route which extend further in a direction parallel to the center line of the escape route than in a direction perpendicular to the center line of the escape route so as to indicate the predefined evacuation direction along the escape route. A pair of light beams may be used to indicate two different evacuation directions along the escape route. It is, however, also conceivable to use a pair of light beams to illuminate, and hence indicate, lateral limitations of the escape route. The evacuation process, due to the presence of guiding boundaries along the escape route, then becomes even more intuitive for the evacuees.

The distance between the pair of light beams may increase with increasing distance from the bottom end portion of the sliding face. Evacuees moving along the escape route then may be guided so as to move further away from the center line of the escape route in a lateral direction with increasing distance from the bottom end of the evacuation slide. As a result, the distribution of evacuees along the escape route may be improved and pile-up of evacuees in the region of the bottom end of the evacuation slide may be avoided.

The light signal generating device may comprise a first lighting element. Alternatively or additionally thereto, the light signal generating device may comprise a second lighting element. A light signal generating device which is equipped with two lighting elements provides for at least some redundancy in case of failure of one of the lighting elements. The light signal generating device may further comprise an energy source, for example, in the form of a battery, an accumulator, or the like which provides the lighting element(s) with electric energy. Moreover, the light signal generating device may comprise a control unit which may be adapted to control the supply of energy to the lighting element(s) and/or which may be adapted to control the operation of the lighting element(s). For example, the control unit may be adapted to control the lighting element(s) in such a manner that the lighting element(s) emit(s) a continuous light signal or a light signal with changing intensity or color over time.

At least one of the first lighting element and the second lighting element may comprise a light emitting diode, in particular a white light emitting diode. A light emitting diode is distinguished by a low energy consumption and a compact design while still providing the desired light quantity and luminance which is necessary to illuminate the predefined evacuation direction along the escape route as desired. It is, however, also conceivable to equip the light signal generating device with a first lighting element and/or a second lighting element comprising another active light source, for example, in the form of a bulb, a laser or a chemically, thermally or otherwise activatable luminescent substance, or a passive light source, for example, a reflector.

At least one of the first lighting element and the second lighting element may comprise a focusing lens adapted to focus the light emitted by the at least one of the first lighting element and the second lighting element. Alternatively or additionally thereto, at least one of the first lighting element and the second lighting element may be equipped with a collimator adapted to parallelize the light rays emitted by the at least one of the first lighting element and the second lighting element so as to produce a light beam having the desired shape, in particular the desired fan-shape.

In a preferred embodiment of the evacuation slide, the first lighting element is arranged in a first lateral edge portion of the evacuation slide. The first lighting element then is particularly suitable to emit a light beam which indicates a first predefined evacuation direction along the escape route and/or a first lateral boundary of the escape route. Alternatively or additionally thereto, the second lighting element may be arranged in a second lateral edge portion of the evacuation slide. The second lighting element then is particularly suitable to emit a light beam which indicates a second predefined evacuation direction along the escape route and/or a second lateral boundary of the escape route.

A light signal generating device having a first lighting element arranged in a first lateral edge region of the evacuation slide and a second lighting element arranged in a second lateral edge region of the evacuation slide is also particularly suitable for illuminating the escape route extending from the bottom end of the evacuation slide having a sliding face which is divided into two independent slideways. The two independent slideways may be separated from each other, for example, by means of a dividing element extending along the sliding face in the center portion thereof. The light beam emitted by the first lighting element may be associated with the first slideway and may serve to indicate a predefined evacuation direction along the escape route for evacuees using the first slideway, whereas the light beam emitted by the second lighting element may be associated with the second slideway and may serve to indicate a predefined evacuation direction along the escape route for evacuees using the second slideway. It is, however, also conceivable to use the two light beams emitted by the lighting elements to define the lateral boundaries of the escape route which is commonly used by the evacuees sliding down the first slideway and evacuees sliding down the second slideway.

At least one of the first lighting element and the second lighting element may be fixed to a bottom end face of the evacuation slide. Using a bottom end face of the evacuation slide for attaching at least one of the first lighting element and the second lighting element allows dispensing with an additional arrangement for positioning and fixing the lighting element(s). Furthermore, a lighting element which is fixed to the bottom end face of the evacuation slide is arranged in an optimum position for emitting light beam illuminating and hence indicating a predefined evacuation direction along the escape route.

Preferably, at least one of the first lighting element and the second lighting element comprises an adjustment device adapted to adjust the orientation of the at least one of the first lighting element and the second lighting element to a shape of the bottom end face of the evacuation slide. In particular, the adjustment device may be adapted to adjust the orientation of the at least one of the first lighting element and the second lighting element to a curvature of the bottom end face of the evacuation slide. The presence of the adjustment device allows the use of standard lighting elements in various evacuation slides, that is to say, in evacuation slides which differ from each other inter alia by the design of the bottom end face. The adjustment device may, for example, be designed in the form of a hinge device which allows changing the orientation of the lighting element relative to an attachment plate via which the lighting element is attached to the bottom end face of the evacuation slide.

At least one of the first lighting element and the second lighting element may comprise a protective housing which may, for example, be cone-shaped and which may, for example, be made of a plastic material. Furthermore, at least one of the first lighting element and the second lighting element may be embedded in a protective foam material which covers sharp edges of the at least one of the first lighting element and the second lighting element and hence protects evacuees from being injured due to contact with such sharp edges.

A vehicle according to the invention comprises an evacuation slide as described above.

Preferably, the vehicle is a passenger vehicle, in particular an aircraft.

BRIEF DESCRIPTION OF THE DRAWINGS

A preferred embodiment of the invention is now described in greater detail with reference to the appended schematic drawings wherein.

DETAILED DESCRIPTION OF THE PREFERRED EMBODIMENTS

Figure 1:
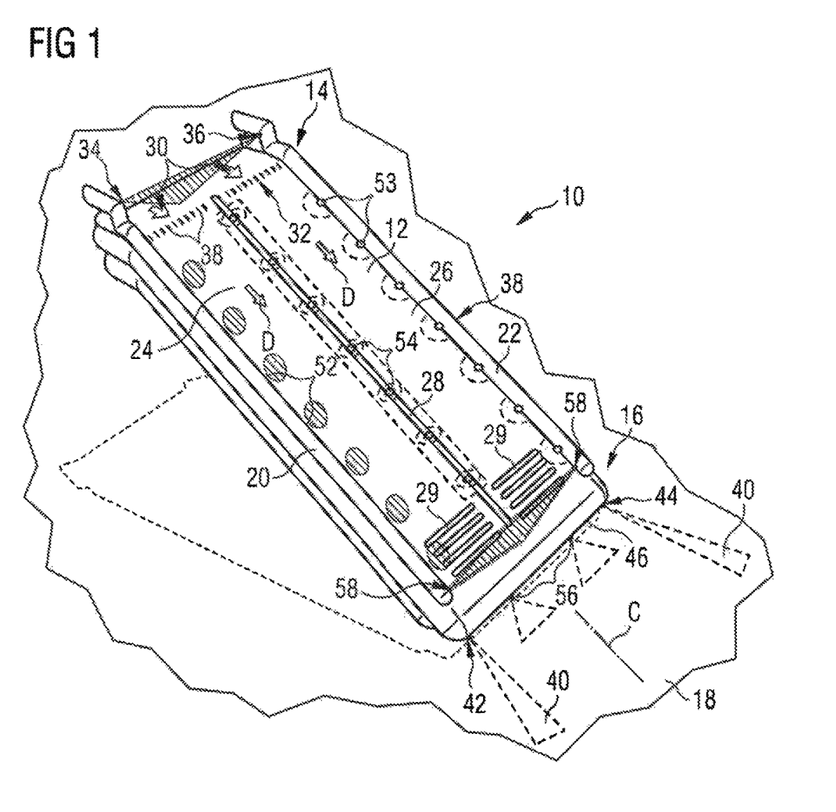
FIG. 1 shows a three dimensional view of an evacuation slide.

FIG. 1 shows an evacuation slide 10 designed in the form of an inflatable device which, when not in use, is stowed as a compact package close to an exit of a region to be evacuated. The evacuation slide 10 comprises a sliding face 12 having a top end portion 14 which is adapted to be positioned adjacent to the exit of the region to be evacuated, and a bottom end portion 16 adapted to be positioned adjacent an escape route 18 leading away from the region to be evacuated and being arranged at a lower height than the region to be evacuated. The sliding face 12 thus defines an inclined slide path connecting the region to be evacuated to the escape route 18 which, relative to the region to be evacuated, is arranged at a lower elevation level.

The evacuation slide 10 is, in particular, suitable for use in an aircraft to evacuate passengers and crew members from an aircraft cabin in case of an emergency. Thus, when inflated, as shown in the Figures, the evacuation slide 10 extends from a door or an emergency exit of the aircraft cabin downwards in the direction of the ground. The escape route 18 extends on the ground and leads away from the aircraft to be evacuated.

In a first lateral edge portion, the evacuation slide 10 is provided with a first lateral limitation element 20. The first lateral limitation element 20 extends upwards from the sliding face 12 and serves to prevent persons sliding down the sliding face 12 of the evacuation slide 10 from falling off the evacuation slide 10. Similarly, a second lateral limitation element 22 is arranged in a second lateral edge portion of the evacuation slide 10 which also extends upwards from the sliding face 12 and also serves to prevent persons sliding down the sliding face 12 of the evacuation slide from falling off the evacuation slide 10. The sliding face 12 of the evacuation slide 10 is divided into two separate slideways 24, 26 which are separated from each other by a dividing element 28 extending in a center region of the sliding face 12 upwards from the sliding face 12. In the bottom end portion 16 of the sliding face 12, deceleration panels 29 are provided for each slideway 24, 26 which have a coarse surface and which serve to decelerate the sliding movement of an evacuee sliding down the evacuation slide 10 before reaching the bottom end of the evacuation slide 10.

In the region of its top end portion 14, the sliding face 12 comprises markings in the form of arrows 30 and in the form of a scratch line 32, the scratch line 32 extending across the sliding face 12 from the first lateral limitation element 20 to the second lateral limitation element 22 and substantially perpendicular to the dividing element 28. The arrows 30 are arranged in an area of the top end portion 14 of the sliding face 12 which is still flat, that is to say, not inclined. By means of the arrows 30, evacuees are directed into the two parallel slideways 24, 26 defined on the sliding face 12. The scratch line 32 is arranged in an area of the top end portion 14 of the sliding face 12 where the inclination of the sliding face 12 changes and hence provides a clear indication for the evacuees where the inclined, that is to say, steep portion of the sliding face 12 begins. Both the arrows 30 and the scratch line 32 are made of a fluorescent material which emits fluorescence when being irradiated with UV-light from UV-light sources 34, 36. The UV-light sources 34, 36 are fixed to a wall portion of the first and the second lateral limitation element 20, 22, respectively, which faces the dividing element 28. When being irradiated with UV-light from UV-light sources 34, 36, the arrows 30 and the scratch line 32 are clearly visible also in dark-of-night conditions.

The evacuation slide 10 further is equipped with a light signal generating device 38 which is adapted to generate light signals for illuminating various parts of the evacuation slide 10. In particular, the light signal generating device 38 is adapted to irradiate at least one light beam 40 onto the escape route 18 which extends further in a direction parallel to a center line C of the escape route 18 than in a direction perpendicular to the center line C of the escape route 18 so as to indicate a predefined evacuation direction along the escape route 18. In the embodiment of an evacuation slide 10 shown in the Figures, the light signal generating device 38 is adapted to irradiate a pair of light beams 40 onto the escape route 18 which extend further in a direction parallel to a center line C of the escape route 18 than in a direction perpendicular to the center line C of the escape route 18 so as to indicate a predefined evacuation direction along the escape route 18.

The light beams 40 produced by means of the light generating device 38, which are already visible for the evacuee when the evacuee steps on the sliding face 12 of the evacuation slide 10 at the top end portion 14 thereof, provide a clear indication for an evacuee on the evacuation direction along which he or she has to move along the escape route 18 after stepping off the sliding face 12 of the evacuation slide 10, not only immediately after leaving the evacuation slide 10, but also at a greater distance therefrom. In particular, the light beams 40 illuminate and hence indicate lateral limitations of the escape route 18, that is to say, guiding boundaries along the escape route 18.

Figure 2:
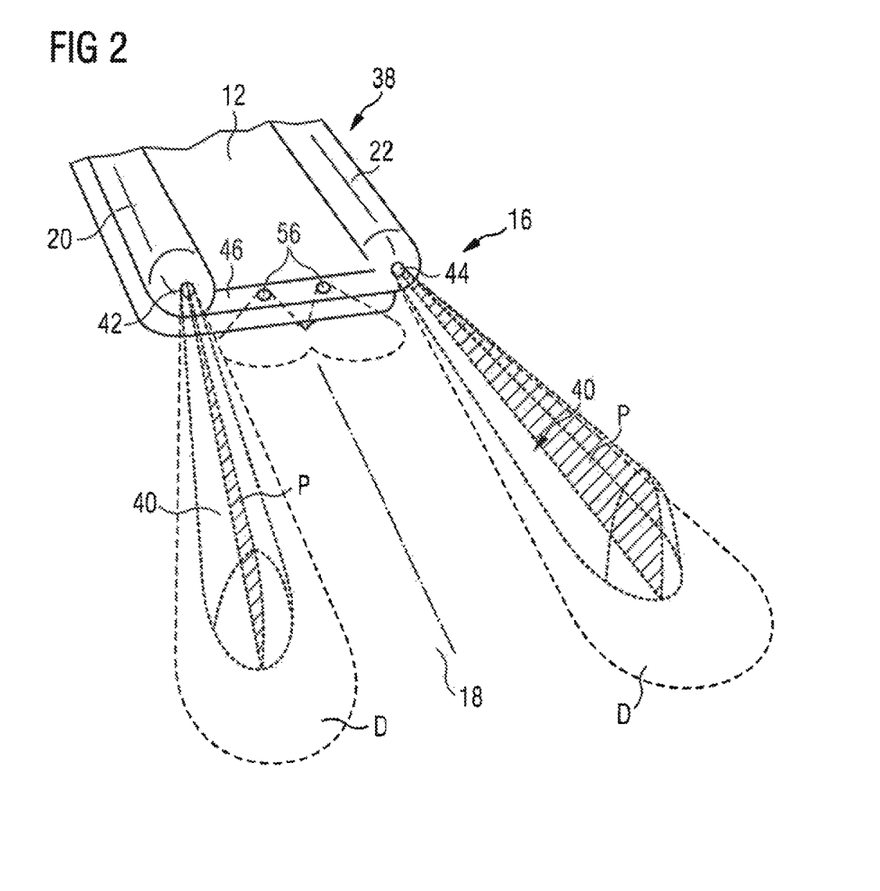
FIG. 2 shows a detailed three dimensional view of a bottom end of the evacuation slide according to FIG. 1.

As becomes apparent in particular from FIG. 2, a distance between the light beams 40, in a direction perpendicular to the center line C of the escape route 18, increases with increasing distance from the bottom end portion 16 of the sliding face 12. Evacuees moving along the escape route 18 thus are guided so as to move further away from the center line C of the escape route 18 in a lateral direction with increasing distance from the bottom end of the evacuation slide 10. As a result, the distribution of evacuees along the escape route 18 is improved and pile-up of evacuees in the region of the bottom end of the evacuation slide 10 is avoided.

Furthermore, the light beams 40 generated by the light signal generating device 38 are substantially fan-shaped. The fan-shaped light beams 40 include an inevitable diffuse portion D, but have a maximum light intensity plane P which extends substantially perpendicular to a surface of the escape route 18. In the embodiment of an evacuation slide 10 shown in the Figures, the fan-shaped maximum light intensity plane P of the light beams 40 extends substantially perpendicular to the surface of the escape route 18 and slanted relative to the center line C of the escape route 18 in order to "broaden" the portion of the escape route 18 delimited by the light beams 40 with increasing distance from the bottom end of the evacuation slide 10 as described above.

Figure 5A:
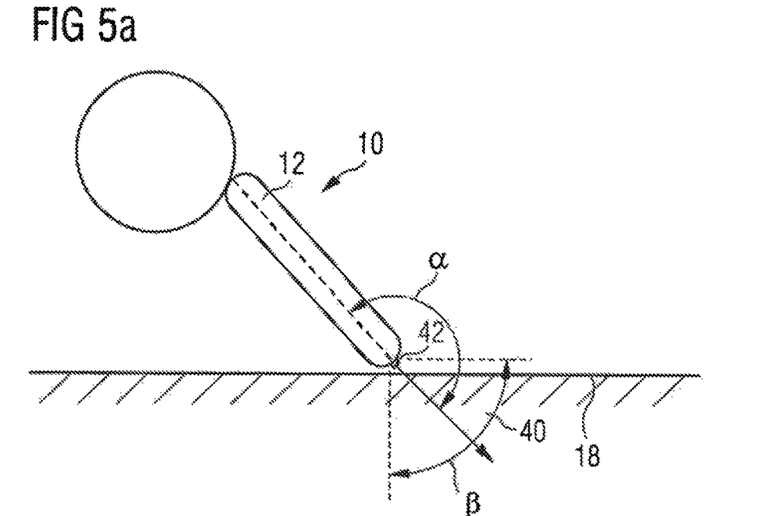
Figure 5B:
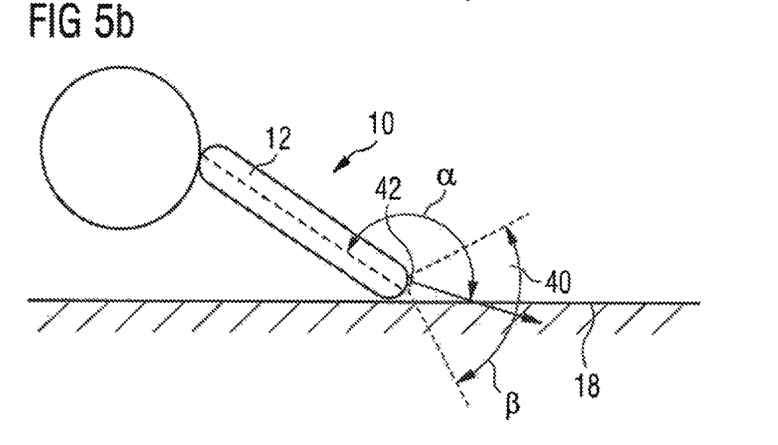
Figure 5C:
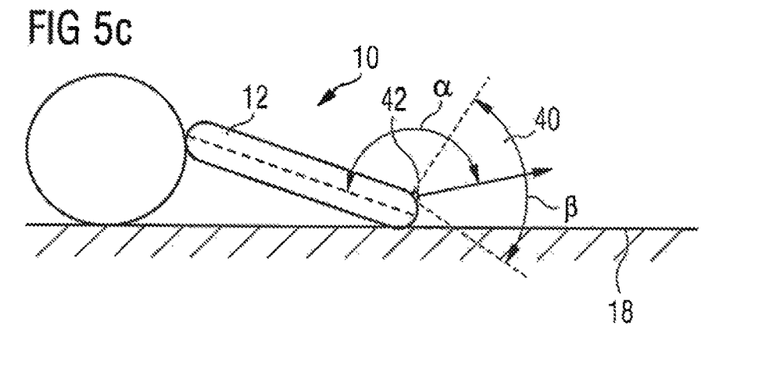

The substantially fan-shaped light beams 40 with a maximum light intensity plane P extending substantially perpendicular to the surface of the escape route 18 have the advantage that the desired illumination and hence indication of the predefined evacuation direction along the escape route 18 can still be achieved even in case of a varying positioning and orientation of the evacuation slide 10 according to FIG. 1 relative to the surface of the escape route 18, see FIGS. 5a to 5c. FIG. 5b shows the regular position and orientation of the evacuation slide 10 relative to the surface of the escape route 18 which the evacuation slide 10 assumes when a landing gear of an aircraft equipped with evacuation slide 10 after an emergency or crash landing of the aircraft is still intact. To the contrary, FIG. 5a depicts the evacuation slide 10 in a position and orientation wherein the inclination of the sliding face 12 of the evacuation slide 10 relative to the surface of the escape route 18 is steeper than normal. Such an arrangement of the evacuation slide 10 may result from obstacles being present in the area of the exit of the region to be evacuated or from improper deployment of the evacuation slide 10. Finally, as shown in FIG. 5c, the evacuation slide 10 may also assume position and orientation wherein the inclination of the sliding face 12 of the evacuation slide 10 relative to the surface of the escape route 18 is lower than normal. Such an arrangement of the evacuation slide 10 may result from a broken landing gear of an aircraft equipped with evacuation slide 10 after an emergency or crash landing.

As becomes apparent from FIGS. 5a to 5c, although the extension of the light beams 40 from the surface of the escape route 18 varies with varying inclination angle and orientation of the evacuation slide 10 relative to the surface of the escape route 18, the light beams 40 are still able to illuminate and hence indicate the predefined evacuation direction along the escape route 18 even in case the inclination angle or the orientation of the evacuation slide 10 relative to the surface of the escape route 18 deviates from the usual inclination angle or orientation, for example, due to a broken landing gear of an aircraft equipped with the evacuation slide.

Figure 3:
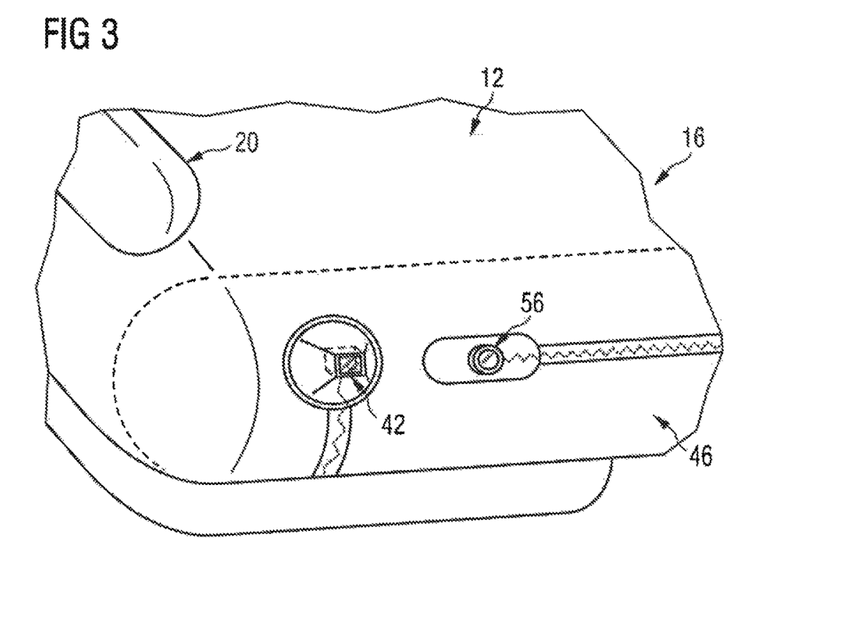
FIG. 3 shows a further detailed three dimensional view of a bottom end of the evacuation slide according to FIG. 1.

The light signal generating device 38 comprises a first lighting element 42 and a second lighting element 44. The first lighting element 42 is arranged in the first lateral edge portion of the evacuation slide 10. Specifically, the first lighting element 42 is fixed to a bottom end face 46 of the evacuation slide 10, see FIGS. 3 and 4. The second lighting element 44 is arranged in the second lateral edge portion of the evacuation slide 10 and is also fixed to the bottom end face 46 of the evacuation slide 10. Both the first lighting element 42 and the second lighting element 44 comprise an adjustment device 47 adapted to adjust the orientation of the lighting element 42, 44 to a shape, in particular the curvature of the bottom end face 46 of the evacuation slide 10. The adjustment device 47 is designed in the form of hinge device which allows changing the orientation of the lighting element 42, 44 relative to an attachment plate 48 via which the lighting element 42, 44 is attached to the bottom end face 46 of the evacuation slide 10.

Figure 4:
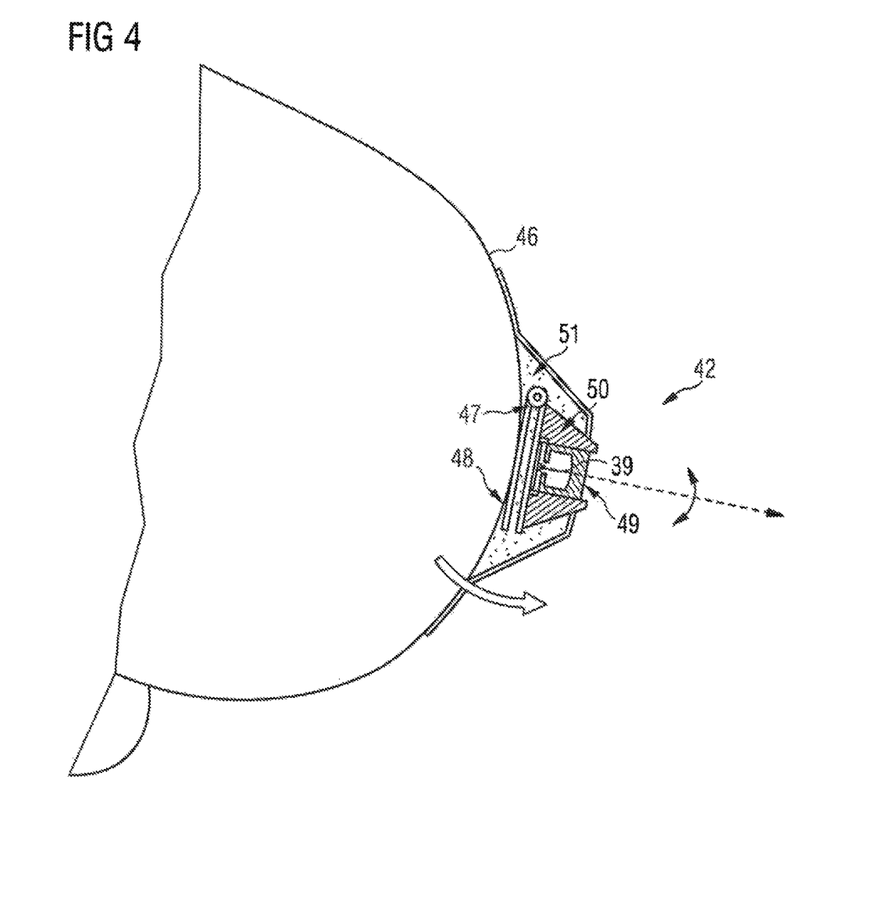
FIG. 4 shows a cross sectional view of a lighting element fixed to a bottom end face of the evacuation slide according to FIG. 1, and FIGS. 5*a* to 5*c* show different options for arranging the evacuation slide according to FIG. 1 relative to a surface of an escape route extending from a bottom end of the evacuation slide.

Each of the first and the second lighting element 42, 44 comprises a light emitting diode 39, in particular a white light emitting diode. The first and the second lighting element 42, 44 thus are of a compact design and can be operated in an energy saving manner. The first and the second lighting element 42, 44 are supplied with electric energy from an energy source of the light signal generating device 38 which may, for example, be designed in the form of a battery or an accumulator (not shown in the Figures). Furthermore, each of the first and the second lighting element 42, 44 comprises a focusing lens/collimator arrangement 49 which is adapted to focus the light emitted by the lighting elements 42, 44 and to parallelize the light rays so as to produce the fan-shaped light beams 40.

Finally, each of the first lighting element 42 and the second lighting element 44 comprises a protective cone-shaped housing 50 which is made of a plastic material which is embedded in a protective foam material 51. The protective foam material 51 covers sharp edges of the lighting elements 42, 44 and hence protects evacuees from being injured due to contact with any such sharp edges.

Operation of the first and the second lighting element 42, 44 is controlled by a control unit (not shown in the Figures) of the light signal generating device 38. Usually, the control unit controls the first and the second lighting element 42, 44 so as to emit a continuous light signal. It is, however, also conceivable to design and control the first and the second lighting element 42, 44 so as to emit a light signal having a varying intensity and/or a varying color over time.

The light signal generating device 38 further comprises a plurality of third and fourth lighting elements 52, 53 which are fixed to the first and the second lateral limitation elements 20, 22 at wall portions thereof which face the center portion of the sliding face 12, that is to say, the dividing element 28, along the sliding face 12. The third and fourth lighting elements 52, 53 serve to illuminate the sliding face 12. Fifth lighting elements 54 are attached to the dividing element 28. Sixth lighting elements 56 are attached to the bottom end face 46 of the evacuation slide 10 in a center portion thereof and serve to illuminate the escape route 18 in an area immediately adjacent to the bottom end of the evacuation slide 10. Finally, seventh lighting elements 58 are provided which illuminate the bottom end portion 16 of the sliding face 12. The operation of the third to seventh lighting elements 50, 52, 54, 56, 58, like the operation of the first and the second lighting element 42, 44, is controlled by means of the control unit of the light signal generating device 38. Furthermore, the third to seventh lighting elements 50, 52, 54, 56, 58, like the first and the second lighting element 42, 44, are supplied with energy from the energy source of the light signal generating device 38.

As is apparent from the foregoing specification, the invention is susceptible of being embodied with various alterations and modifications which may differ particularly from those that have been described in the preceding specification and description. It should be understood that I wish to embody within the scope of the patent warranted hereon all such modifications as reasonably and properly come within the scope of my contribution to the art.

The invention claimed is:

1. An evacuation slide comprising:
a sliding face having a top end portion adapted to be positioned adjacent to an exit of a region to be evacuated, and a bottom end portion adapted to be positioned adjacent to an escape route leading away from the region to be evacuated and being arranged at a lower height than the region to be evacuated, and
a light signal generating device adapted to irradiate at least one light beam onto the escape route which extends further in a direction parallel to a center line of the escape route than in a direction perpendicular to the center line of the escape route so as to indicate a predefined evacuation direction along the escape route, wherein the light signal generating device is adapted to generate at least one substantially fan blade-shaped light beam with a maximum light intensity plane extending substantially perpendicular to a surface of the escape route and slanted relative to the center line of the escape route in order to broaden the portion of the escape route delimited by the light beam with increasing distance from the bottom end of the evacuation slide.

2. The evacuation slide according to claim 1, wherein the light signal generating device is adapted to irradiate a pair of light beams onto the escape route which extend further in a direction parallel to the center line of the escape route than in a direction perpendicular to the center line of the escape route so as to indicate a predefined evacuation direction along the escape route.

3. The evacuation slide according to claim 2, wherein the distance between the pair of light beams increases with increasing distance from the bottom end portion of the sliding face.

4. The evacuation slide according to claim 1, wherein the light signal generating device comprises at least one of a first lighting element and a second lighting element.

5. The evacuation slide according to claim 4, wherein at least one of the first lighting element and the second lighting element comprises a light emitting diode.

6. The evacuation slide according to claim 4, wherein at least one of the first lighting element and the second lighting element comprises at least one of a focusing lens and a collimator.

7. The evacuation slide according to claim 4, wherein the first light element is arranged in a first lateral edge portion of the evacuation slide, and wherein the second light element is arranged in second lateral edge portion of the evacuation slide.

8. The evacuation slide according to claim 4, wherein at least one of the first lighting element and the second lighting element is fixed to a bottom end face of the evacuation slide.

9. The evacuation slide according to claim 8, wherein at least one of the first lighting element and the second lighting element comprises an adjustment device adapted to adjust the orientation of the least one of the first lighting element and the second lighting element to a shape of the bottom end face of the evacuation slide.

10. The evacuation slide according to claim 4, wherein at least one of the first lighting element and the second lighting element is embedded in a protective foam material.

11. A vehicle comprising an evacuation slide comprising:
a sliding face having a top end portion adapted to be positioned adjacent to an exit of a region to be evacuated, and a bottom end portion adapted to be positioned adjacent to an escape route leading away from the region to be evacuated and being arranged at a lower height than the region to be evacuated, and
a light signal generating device adapted to irradiate at least one light beam onto the escape route which extends further in a direction parallel to a center line of the escape route than in a direction perpendicular to the center line of the escape route so as to indicate a predefined evacuation direction along the escape route, wherein the light signal generating device is adapted to generate at least one substantially fan blade-shaped light beam with a maximum light intensity plane extending substantially perpendicular to a surface of the escape route and slanted relative to the center line of the escape route in order to broaden the portion of the escape route delimited by the light beam with increasing distance from the bottom end of the evacuation slide.

12. The vehicle according to claim 11, wherein the vehicle is an aircraft.

13. The evacuation slide according to claim 4, wherein at least one of the first lighting element and the second lighting element comprises a white light emitting diode.

14. An evacuation slide comprising:
a sliding face having a top end portion adapted to be positioned adjacent to an exit of a region to be evacuated, and a bottom end portion adapted to be positioned adjacent to an escape route leading away from the region to be evacuated and being arranged at a lower height than the region to be evacuated, and
a light signal generating device adapted to irradiate at least one light beam onto the escape route which extends further in a direction parallel to a center line of the escape route than in a direction perpendicular to the center line of the escape route so as to indicate a predefined evacuation direction along the escape route, wherein the light signal generating device is adapted to generate at least one substantially fan blade-shaped light beam with a maximum light intensity plane extending substantially perpendicular to a surface of the escape route, and wherein the light signal generating device is adapted to irradiate a pair of light beams onto the escape route which extend further in a direction parallel to the center line of the escape route than in a direction perpendicular to the center line of the escape route so as to indicate a predefined evacuation direction along the escape route.

* * * * *